United States Patent Office 3,401,135
Patented Sept. 10, 1968

3,401,135
ADHESIVE COMPOSITION OF AN INTERPOLYMER CONTAINING ETHYLENE GLYCOL MONOMETHACRYLATE ADMIXED WITH A BLOCKED POLYISOCYANATE
Yukio Sato, Osaka, Japan, assignor to Takeda Chemical Industries, Ltd., Osaka, Japan
No Drawing. Filed July 20, 1965, Ser. No. 473,476
Claims priority, application Japan, July 21, 1964, 39/41,695
11 Claims. (Cl. 260—29.6)

ABSTRACT OF THE DISCLOSURE

An adhesive composition consisting substantially of (A) about 70 to 95 weight parts of latex containing about 20 to 60 weight parts of copolymer obtained by the copolymerization of (a) about 70 to about 99.5% weight percent of a polymerizable compound having an olefinic double bond, (b) about 0.25 to about 15 weight percent of acrylic or methacrylic acid, and (c) about 0.25 to about 15 weight parts of ethylene glycol monomethacrylate, and (B) about 5 to about 30 weight parts of blocked polyisocyanate, has been found to be an excellent adhesive, particularly because of its long pot life, superior adhesive strength, and ability to withstand dry-cleaning liquids.

---

This invention relates to an adhesive composition which is particularly suitable as an adhesive agent for the production of non-woven fabric, artificial leather, laminate, decorative sheet or flocking products.

A variety of adhesive compositions comprising, for example, styrene-butadiene copolymer latex, acrylonitrile-butadiene copolymer latex, acrylic ester copolymer latex or vinylacetate polymer latex have been proposed as an adhesive agent useful for the production of a non-woven fabric, flocking products, laminate, etc., but these adhesive compositions are poor in adhesive force, which is, of course, a big drawback for an adhesive agent.

For eliminating the said drawback, another type of adhesive composition has been proposed, which comprises employing, together with the latex mentioned above, a cross-linking agent such as a methylol group-containing compound, an epoxy compound, an amine or a metal oxide.

These adhesive compositions, however, still do not have sufficient adhesive force and moreover possess short pot-life, that is, they are apt to become gelled during storage or even in the course of preparation or application, so that they often are not able to withstand severe service. These disadvantages prevent such adhesive compositions from being employed effectively on an industrial scale.

The present invention is directed to the embodiment of adhesive compositions which have excellent adhesive force and a long pot-life and are particularly suitable for the production of non-woven fabric, artificial leather, laminate, decorative sheet or flocking products, and is based on the fact that an adhesive composition having an excellent adhesive force and a long pot-life is obtained by employing ethyleneglycol monomethacrylate, allyl alcohol or N-methylol acrylic amide and a carboxylic acid of the formula $$CH_2=C-COOH$$
$$|$$
$$(CH_2)_nH$$

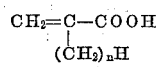

wherein $n$ is zero or one, as one of the monomer components composing a copolymer, and blocked isocyanate as a cross-linking agent.

An adhesive composition of the present invention substantially consists of (A) about 70 to about 95 weight parts of latex containing about 20 to about 60 weight parts of a copolymer which is obtained by the polymerization of (a) about 70 to about 99.5 weight percent of polymerizable compound having olefinic double bond, (b) about 0.25 to about 15 weight percent of carboxylic acid of the formula $$CH_2=C-COOH$$
$$|$$
$$(CH_2)_nH$$

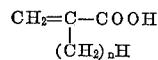

wherein $n$ is zero or one, and (c) about 0.25 to about 15 weight parts of ethylene glycol monomethacrylate, allyl alcohol or N-methylol acrylamide, and (B) about 5 to about 30 weight parts of blocked isocyanate obtained by the reaction of a blocking agent and isocyanate having two or more terminal NCO groups.

The first object of the present invention is to embody an adhesive composition having an excellent adhesive force and a long pot-life, particularly useful for the production of non-woven fabric, flocking products, laminate, artificial leather or decorative sheet.

The second object is to provide non-woven fabric, flocking products, laminate, artificial leather or decorative sheet which have excellent properties. The second object is realized by employing the present adhesive composition.

One of the components composing the present adhesive composition is a latex containing a copolymer of ethylene glycol monomethacrylate, allyl alcohol or N-methylol acrylamide, carboxylic acid and polymerizable compound having olefinic double bond.

The carboxylic acid is represented by the formula $$CH_2=C-COOH$$
$$|$$
$$(CH_2)_nH$$

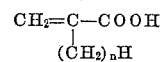

wherein $n$ is zero or one, which includes acrylic acid and methacrylic acid.

As the polymerizable compound having olefinic double bond, there are exemplified, for example, styrene, butadiene, isoprene, chloroprene, acrylonitrile, vinyl acetate, vinyl chloride, acrylic acid ester (e.g. methyl, ethyl, propyl, or butyl ester) and methacrylic acid ester (e.g. methyl, ethyl, propyl, or butyl ester).

The latex containing a copolymer can be directly prepared by subjecting the ethylene glycol monomethacrylate, allyl alcohol or N-methylol acrylamide, the carboxylic acid and the polymerizable compound having olefinic double bond to emulsion copolymerisation.

The copolymerization is carried out in per se known manner, for example, by copolymerizing the monomers in an aqueous medium under heating in the presence of an emulsifier (e.g. sodium oleate, aliphatic alcohol sulfonate, sodium alkylarylene sulfonate, polyoxyalkylene glycol ester, polyoxyalkylene alkylphenol, etc.), and a catalyst (e.g., ammonium persulfate, potassium persulfate, hydrogen peroxide, etc.).

Anti-oxidant (e.g., 2,6-di-tert-butyl-p-cresol, 2-butyl-4-hydroxyanisol, etc.), protective colloid (e.g., casein, methyl cellulose, polyvinyl alcohol, gum arabic, etc.), modifier (e.g., dodecylmercaptan, isopropyl mercaptan, diazothioether, etc.), and other additives can, if desired, be present in the reaction system.

The amount of the carboxylic acid employed and that of the ethylene glycol monomethacrylate or N-methylol acrylamide is about 0.25 to about 15, preferably about 0.5 to about 5 weight percent based upon the total weight of the monomers employed, that of the polymerizable compound having olefinic double bond being about 70 to about 99.5, preferably about 90 to about 99 weight percent. Molecular weight of the copolymer is, preferably, from 20,000 to 7,000,000.

The amount of the copolymer in thus-obtained latex is adjusted to about 20 to about 60, preferably 30 to 45 weight parts by, for example, controlling the amount of the monomers polymerized, or diluting or condensing the resultant latex.

The other component composing the present adhesive composition is a blocked isocyanate compound. The blocked isocyanate compound is prepared by reacting a blocking agent and an isocyanate compound having two or more terminal NCO groups. The blocking isocyanate compound can be employed as a mixture or a crude.

As a blocking agent, there are exemplified, for example, phenols (e.g., phenol, thiophenol, methylphenol, cresol, etc.), tertiary alcohols (e.g., t-butyl alcohol, t-amyl alcohol, etc.), active methylene compounds (e.g., acetoacetic acid, acetyl acetone, dialkyl malonate, etc.), oximes (e.g., methylethylketone oxime, cyclohexanone oxime, etc.), imines (e.g., ethylene imine, etc.) and lactams (e.g., ε-caprolactam, δ-valerolactam, γ-butyrolactam, etc.). The blocking agent may be employed as a mixture of these.

The isocyanate compound having two or more terminal NCO groups is prepared by reacting an excess amount of a low molecular isocyanate compound having two or more NCO groups and a molecular weight of about 100 to about 700, such as 2,4-tolylene diisocyanate, 2,6-tolylene diisocyanate, m-xylylene-diisocyanate, p-xylylene-diisocyanate, hexamethylene-1,6-diisocyanate, butylene-1,2-diisocyanate, diphenylmethane-4,4'-diisocyanate, 3,3'-dimethyl-4,4'-biphenylene diisocyanate, triphenylmethane-4,4',4'-triisocyanate and diphenylmethane-2,4,4'-triisocyanate or a mixture thereof, with a compound having two or more active hydrogen atoms such as a low molecular polyol having a molecular weight of about 50 to about 500 (e.g., ethylene glycol, propylene glycol, trimethylol propane, glycerin, hexantriol, sorbitol, mannitol, lactitol, sorbitan and mannitan) or a high molecular polyol having a molecular weight of about 500 to about 7000 (e.g., polyester polyol and polyether polyol) in the presence or absence of solvent having no active hydrogen atom such as ketones (e.g., acetone, methylethylketone, etc.), esters (e.g., ethyl acetate, butyl acetate, etc), or aromatic hydrocarbons (e.g., benzene, toluene, xylene, etc.), at room temperature (about 20 to about 30° C.) or by heating up to a temperature between about 40 and about 120° C.

The polyether polyols are those which are obtained by a polymerization of alkylene oxide such as ethylene oxide, propylene oxide, or butylene oxide, using as an initiator a low molecular polyol as mentioned above, by such a known method as described in "High Polymer, vol. XIII, Polyethers, Part I" (1963), published by Norman G. Gaylord, Interscience Publishers, New York. The polyester polyols are those which are obtained by reacting a polycarboxylic acid or its acid anhydride (e.g., adipic acid, phthalic acid, maleic acid, itaconic acid or their acid anhydrides) with an excess of a low molecular polyol (e.g., ethylene glycol, propylene glycol, butylene glycol, glycerin, trimethylol propane, etc.), under heating in the presence of an acid catalyst in per se known manner as described in "Polyesters and Their Application," 3rd printing, April 1959, published by Bjorksten Research Lab. Inc., New York.

Among the isocyanate compounds having two or more terminal NCO groups, those having three or more terminal NCO groups are particularly preferable since they can give an adhesive composition not only having an especially excellent adhesive force but also producing an adhesive film of good mechanical properties, oil resistance and water-resistance.

The isocyanate compound having three or more terminal NCO groups is prepared by reacting a low molecular isocyanate compound having three or more NCO groups with a compound having two or more active hydrogen atoms, or by reacting a low molecular isocyanate compound having two or more NCO groups with a compound having three or more active hydrogen atoms.

The reaction between the blocking agent and the isocyanate compound having two or more terminal NCO groups readily proceeds at room temperature or by heating up to a temperature between about 40 and about 120° C., using the former in approximately equimolar amount or in a little excess relative to the NCO groups in the latter in the presence or absence of solvent having no active hydrogen atom such as ketones, esters or aromatic hydrocarbons. As a result of the reaction, the terminal NCO groups in the isocyanate compound are changed into blocked isocyanate groups.

The present adhesive composition is prepared by mixing the latex with the blocked isocyanate compound, the latter being preferably mixed as an emulsion. The emulsion is prepared by emulsifying the blocked isocyanate compound in water or an organic solvent, using an emulsifier as mentioned above. The ratio of the latex to the blocked isocyanate compound is selected from the range of about 95/5 to about 70/30 (weight/weight).

Of the present adhesive compositions, those which are obtained by using oxime, active methylene compound, lactam or imine as a blocking agent are especially suitable for the treatment of fabrics, since they are stable to degradation and coloring and easy in operation, and moreover they are activated (i.e., NCO groups are regenerated) at a rather lower temperature.

According to the purpose, the present adhesive composition may have incorporated therein paint, anti-oxidant, softener, water-proof agent, insecticide, fire-proof agent and other additives. The viscosity of the composition may be increased by adding water-soluble compound such as polyacrylic acid salt, polyvinyl alcohol, methyl cellulose, sodium carboxymethyl cellulose, ammoniacal casein, etc.

When using the present composition for the production of non-woven fabrics, a heat sensitizing agent such as ammonium sulfate, diphenyl guanidine or polyvinyl methyl ether can be added for the purpose of preventing migration.

The present adhesive composition is applied on a matter to be adhered by dipping or brushing followed by hardening by heating at about 110 to about 250° C., preferably at about 130 to 170° C., for about 3 to 10 minutes.

For the purpose of lowering the hardening temperature, a catalyst can be incorporated into the present adhesive composition. A preferable catalyst is a distannoxane compound represented by the formula

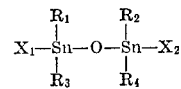

wherein $X_1$ stands for a halogen atom, a hydroxyl group, a lower alkoxy group, carboxylic acyloxy, NCO or NCS, $X_2$ stands for a hydroxyl group, a lower alkoxy group, carboxylic acyloxy, NCO or NCS, and each of $R_1$, $R_2$, $R_3$ and $R_4$ stands for lower alkyl group.

Thus prepared adhesive composition has an excellent adhesive force and can be stored for a long time without any degradation or gelation.

Employing the present adhesive composition, non-woven fabric can be prepared by applying a per se known method for preparing known non-woven fabric. More concretely stated, web in which fibers are random or semi-oriented is prepared by a dry method, then the web is immersed into the adhesive composition, and excess of the composition is removed with a squeeze roll or with suction in vacuum. Alternatively, the said web is subjected to needle punching, followed by spraying the adhesive composition over the web, or by immersion of the web into the adhesive composition. It is also possible to disperse relatively short filaments (i.e., piles) in the adhesive composition, from which they are then taken out in a state of web, the web being squeezed by pressing to control the amount of pick-up. Alternatively, such filaments as mentioned above formed beforehand into web by the use of an inert organic solvent are immersed in the adhesive composition, followed by adjusting the amount of the adhesive composition impregnated into the web. Then thus-treated web is subjected to curing by heating to obtain the desired non-woven fabric.

Fibers of which the web is made can be natural or synthetic fibers. For example, there may be employed such fibers as cotton, rayon, acetate rayon, polyester type fiber, polyamide type fiber, polyvinyl alcohol type fiber, acrylic type fiber, etc.

Flocking products can be prepared in per se known manner with the employment of the present adhesive composition. For example, a cloth or a sheet made of various kinds of fiber exemplified as above is immersed in the present adhesive composition, followed by removing excess adhesive composition by squeezing. Or, the adhesive composition can be applied on a surface of the cloth or sheet. Subsequently, on the surface of thus treated cloth or sheet, short filaments (i.e., piles) made of fibers exemplified as above are deposited by, for example, an electrostatic method, followed by curing by heating to obtain the desired flocking product.

The employment of the present adhesive composition successfully gives an artificial leather. For example, polyvinyl chloride or foamable polyvinyl chloride sheet is first immersed in or has applied thereto, the present adhesive composition, followed by drying, then polyamide type resin dissolved in an organic solvent is applied onto the surface of the sheet, followed by drying. Thus treated sheet is cured by heating to obtain an artificial leather.

Laminates or decorative sheets may also be prepared in per se known manner with the employment of the present adhesive composition. For example, two or more sheets made of plastics such as polyester resin, polyamide resin, polystyrene resin, polyvinyl chloride resin, polyethylene resin, polycarbonate resin, polyacrylic acid resin, polyvinyl alcohol resin, polyurethane resin, polyvinyl acetate resin, synthetic rubbers and so on, are treated with the present adhesive composition by dipping or brushing. Thus treated sheets are piled up together and cured by heating to obtain a laminate.

Decorative papers or sheets are immersed in, or have applied thereto, the present adhesive composition and placed on a base consisting of, for example, polyester, polycarbonate, polyvinyl chloride, board, plywood or metal sheet which may be, if desired, previously treated with the adhesive composition. Then the thus prepared product is cured by heating, if desired, under pressure to obtain so-called decorative sheet.

In order to further illustrate the present invention, the following examples are given. In these examples, temperatures are all in degrees centigrade, and the abbreviations "kg." "g./m.²," "mm.," and "cm." should be read as "kilogram(s)," "gram(s) per square centimeter," "millimeter(s)" and "centimeter(s)," respectively.

Parts and percentages are by weight, unless otherwise indicated.

Example 1

In a pressure-proof vessel, 40 parts of sodium alkylbenzenesulfonate, 4 parts of polyoxyethylene octylphenol, 105 parts of deionized water, 0.5 part of tert.-dodecylmercaptan, 0.2 part of sodium hydrogen sulfite, 3.5 parts of methacrylic acid, 3.5 parts of ethylene glycol monomethacrylate, 43 parts of methyl methacrylate and 50 parts of butadiene are agitated to make an emulsion. After the temperature of the emulsion is adjusted to 40° C., polymerization is initiated by adding 20 parts of an aqueous solution containing 3 parts of potassium persulfate. The polymerization is stopped after 15 hours by the addition of an aqueous solution of potassium dimethyldithiocarbamate. The resultant latex is adjusted to pH 8.5 by the addition of aqueous ammonia, followed by adding an emulsion of anti-oxidant in an amount of 1.5 percent relative to the amount of gummy substance in the latex for the purpose of improving thermal resistibility and light resistibility.

Thus obtained latex is referred to as (I). Total content of the solid material in the latex (I) is 45 percent.

13.4 parts of trimethylol propane dissolved in 92 parts of ethyl acetate is added slowly to 52.2 parts of a mixture of 80 parts of 2,4-tolylene diisocyanate and 20 parts of 2,6-tolylene diisocyanate (the mixture being hereinafter referred to as TDI) so that reaction takes place at 50 to 55° C. for 4 to 5 hours. Into the reaction mixture 29 parts of methyl ethyl ketone oxime is added at room temperature to cause blocking by further reaction for 2 hours.

Thus obtained reaction mixture containing blocked isocyanate compound, which is found to contain less than 1 percent of free isocyanato radical, is agitated with 368 parts of an aqueous solution containing a non-ionic surface active agent prepared by the addition of ethylene oxide to polypropylene glycol (Pluronic P-66) and an anionic surface active agent consisting of sodium sulfosuccinate dialkylester (Rapisol B–80) to obtain an emulsion.

The emulsion is referred to as (II). Total content of the solid material in the emulsion is 20 percent.

52.2 parts of TDI dissolved in 105 parts of ethyl acetate is allowed to react with 57.7 parts of methyl ethyl ketone oxime, followed by subjecting the reaction mixture to the same treatment as above to obtain an emulsion. Thus obtained emulsion is referred to as (III).

100 parts each of the latex (I) is mixed with 22.5 parts of emulsion (II) and with 22.5 parts of the emulsion (III) respectively to obtain two kinds of adhesive compositions. These compositions are diluted with water so as to adjust the respective total contents of solid material to 20 percent by volume relative to the whole volume of each of the aqueous adhesive compositions.

Into each of the thus prepared adhesive compositions, there is immersed 50 g./m.² random web of polyethylene terephthalate (3 deniers) interposed between wire netting of stainless steel, followed by squeezing so-immersed materials with a squeeze roll to control the weight of pick-up of the adhesive composition to about 250 g. Thus treated web is dried at 100° C. for 10 minutes, followed by heating at 150° C. for 5 minutes to obtain non-woven fabric.

The properties of the respective non-woven fabrics are as follows:

TABLE 1

| Adhesive composition | Tensile strength (kg) | Elongation (percent) | Dry cleaning test (percent) | Resin Pick-up (percent to web) |
|---|---|---|---|---|
| (I)+(II) | 9.2 | 41 | 6.2 | 103 |
| (I)+(III) | 8.2 | 54 | 15.3 | 97.5 |

Example 2

In a pressure-proof vessel, 40 parts of sodium alkylbenzenesulfonate, 40 parts of polyoxyethylene octylphenol, 115 parts of deionized water, 20 parts of butyl acrylate, 73 parts of ethyl acrylate, 5 parts of acrylic acid, 2 parts of ethylene glycol monomethacrylate, 0.5 part of potassium chloride and 0.05 part of sodium hydrogen sulfite are agitated to make an emulsion. After the temperature of the emulsion is adjusted to 40 to 60° C., polymerization is initiated by adding 10 parts of an aqueous solution containing 10 percent of potassium persulfate. The resultant latex is adjusted to pH 6.5 by adding aqueous ammonia. Total content of solid material in the latex is 45 percent.

By the employment of trimethylol propane, TDI and isocyanate blocking agent (variable), an emulsion containing blocked isocyanate compound is prepared in the same manner as in Example 1.

Adhesive composition is prepared by mixing 100 parts of the latex with 22.5 parts of the emulsion containing blocked isocyanate compound, and by adjusting the total content of the solid material in the composition to 20 percent by the addition of water.

Into each of the thus prepared adhesive compositions, there is immersed 50 g./m.² random web of polyethylene terephthalate (3 deniers) interposed between wire nettings of stainless steel followed by squeezing the so-immersed materials with a squeeze roll to control the weight of pickup of the adhesive composition to about 200 g. Thus treated web is dried at 100° C. for 10 minutes, followed by heating at 150° C. for 8 to 10 minutes to obtain non-woven fabric.

The properties of the non-woven fabric are as follows:

TABLE 2

| Isocyanate blocking agent used | Pick-up of resin (percent) | Tensile strength (kg.) | Tear strength (kg.) | Dry cleaning test (percent) |
|---|---|---|---|---|
| m-Cresol | 78.3 | 4.5 | 9.95 | 9.0 |
| Cyclohexanone oxime | 81.7 | 4.9 | 2.3 | 3.0 |
| Ethyl acetoacetate | 82.2 | 5.1 | 2.0 | 3.2 |
| Ethylene imine | 80.9 | 5.3 | 1.70 | 6.6 |
| Control [1] | 80 | 4.9 | 1.58 | 4.7 |

[1] Control: Employed methylated methylolmelamine in place of blocked isocyanate compound.

Example 3

In a pressure-proof vessel, 4 parts of sodium alkylbenesulfonate, 4 parts of polyoxymethylene octylphenol, 105 parts of deionized water, 0.5 part of tert.-dodecylmercaptan, 0.2 part of sodium hydrogen sulfite, 3 parts of methacrylic acid, 3.5 parts of ethylene glycol monomethacrylic acid ester, 38.5 parts of acrylonitrile and 55 parts of butadiene are agitated to make an emulsion. After the temperature of the emulsion is adjusted to 40° C., polymerization is initiated under pressure by adding 20 parts of aqueous solution containing 3 percent of potassium persulfate. Polymerization is stopped after 15 hours by the addition of aqueous solution containing potassium dimethyldithiocarbamate. The resultant latex is adjusted to pH 8.5 by the addition of aqueous ammonia, followed by the addition of an emulsion containing antioxidant in amount of 1.5 percent relative to the total amount of gummy material in the latex for the purpose of improving thermal resistibility and light resistibility.

100 parts of thus prepared latex is mixed with 27.5 parts of the emulsion (II) of Example 1, followed by increasing the viscosity by adding 25 parts of an aqueous solution of ammonia containing 20 percent of casein, to obtain an adhesive composition.

Thus prepared adhesive composition is applied onto the surface of cotton cloth in a thickness of about 0.3 mm. Polyamide piles of 3 mm. and 15 deniers are deposited on the surface of the thus-treated cloth by an electrostatic method under such conditions as electrode distance of 10 cm., voltage of 40 kilovolts and charge time of 15 seconds, and then dried at 100° C. for 10 minutes, followed by heating at 145° C. to 150° C. for 10 minutes to obtain a cotton cloth fast deposited with polyamide piles on its surface. Thus obtained cotton cloth is highly water-proof, highly solvent resistant and its wet abrasion resistance is 4000 cycles. The wet abrasion resistance is shown by the abrasion cycles which are required to peel off the deposited piles on the cotton cloth when the cotton cloth is abraded with an emery cloth of No. 600 under a load of 500 g.

Example 4

In a pressure-proof vessel, 40 parts of sodium alkylbenzenesulfonate, 40 parts of polyoxyethylene octylphenol, 115 parts of deionized water, 5 parts of methacrylic acid, 10 parts of butyl acrylate, 82 parts of ethyl acrylate, 3 parts of ethylene glycol monomethacrylate, 0.5 part of potassium chloride and 0.05 part of sodium hydrogen sulfite are agitated to be brought into the form of an emulsion.

After adjusting the temperature of the emulsion to 40° C., polymerization is started by adding 10 parts of aqueous solution containing 1 percent of potassium persulfate. The resultant mass is adjusted to pH 6.5 by the addition of aqueous ammonia. Thus prepared latex contains 45 percent of solid material.

100 parts of polyester having an hydroxyl number of 320 and acid number of less than 4, which is produced by the condensation reaction of 88 parts of adipic acid, 36 parts of ethylene glycol and 13 parts of trimethylol propane, is added to a mixture of 104 parts of TDI and 30 parts of toluene under heating at 100 to 110° C. and allowing the reaction to take place for 90 minutes.

33 parts of m-cresol is added to the reaction mixture at the same temperature and allowing the reaction to take place for 6 hours, followed by treating as in Example 1 to obtain an emulsion containing blocked isocyanates compounds. Total content of solid material in the emulsion is 20 percent.

100 parts of the latex is mixed with 27.5 parts of the emulsion containing blocked isocyanates compounds, followed by increasing the viscosity by the addition of a small amount of concentrated ammonia to obtain an adhesive composition.

With the employment of the thus obtained adhesive composition, a cotton cloth deposited with rayon piles of 25 mm. length and 1.5 deniers is prepared in the same manner as in Example 3. The cotton cloth deposited with rayon piles is highly water-proof and shows a high solvent resistance. When the cloth deposited with rayon piles is abraded with a calico cloth under a load of 500 g., the abrasion cycles for peeling the deposited rayon piles exceed 6000.

Example 5

109 parts of an ethyl acetate solution containing 75 percent of an adduct having terminal NCO groups, which is obtained by the reaction between TDI and trimethylol propane, is heated at 70° C. to 80° C. in a reaction vessel and has added slowly thereto 135 parts of toluene solution containing 80 parts of polyester which has a hydroxyl number of 40 and an acid number of less than 3 and is prepared by the condensation reaction of diethylene glycol, isophthalic acid and adipic acid, allowing the reaction to take place for two hours to obtain a reaction mixture having an amine equivalent of 1050.

29 parts of methyl ethyl ketone oxime is added slowly to the reaction mixture at room temperature. The mixture is then kept standing at the same temperature for two hours to produce a blocked isocyanate compound, which is then brought into the form of an emulsion containing 20 percent of solid material in the same manner as in Example 1.

An adhesive composition is prepared by mixing 20 parts of the emulsion obtained above and 100 parts of the latex obtained in Example 3.

A sheet of foamable and elastic polyvinyl chloride resin has applied thereto first the adhesive composition prepared above, followed by drying at about 80° C., and then methyl alcohol solution containing N-methoxymethylated polyamide, followed by drying.

Thus treated sheet is heated at 200° C. for 15 minutes to allow the gelation and the foaming reaction to take place to produce an elastic and foamed polyvinyl chloride resin sheet coated fast with polyamide layer.

Example 6

13.4 parts of trimethylol propane dissolved in 92 parts of ethyl acetate is added slowly to 56.4 parts of m-xylylene diisocyanate

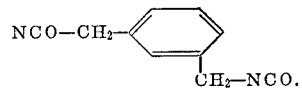

The mixture is heated at 50 to 55° C. for 6 to 7 hours to allow the reaction to take place. Into the reaction mixture 58 parts of phenol and a small amount of pyridine are added at 50 to 55° C. to allow further reaction to take place.

Thus obtained reaction mixture containing blocked isocyanates, which is found to contain less than 1 percent of free isocyanato radical, is made into an emulsion containing about 20 percent of solid matter, in the same manner as that described in Example 1.

An adhesive composition is prepared by mixing 17.5 parts of the emulsion obtained above, 100 parts of the latex obtained in Example 3 and 3 parts of 20 percent solution of ammonia milk casein.

To polyamide cloth and cotton cloth is applied the adhesive composition prepared above, in an amount of 30 g./m.², followed by drying at 100° C. for 5 minutes.

Each of the thus treated cloths is placed on an elastic polyvinyl chloride sheet and heated at 160° C. for about 30 seconds under pressure to obtain laminates.

The adhesion of each laminate is as follows:

| Adhesive composition | Adhesion [1] (kg./5 cm. width) | |
|---|---|---|
| | Polyamide cloth | Cotton cloth |
| Present adhesive composition | 3.6 | 6.3 |
| Polyvinyl chloride paste (control) | | 2.5 |

[1] Adhesion is represented as the force required for peeling the adhered cloth, at a velocity of 30 cm./min.

Example 7

Into a pressure-proof vessel with a reflux condenser, 70 parts of methyl acrylate, 25 parts of vinyl acetate, 3 parts of methacrylic acid, 2 parts of allyl alcohol, 3 parts of polyethyleneoxide lauryl ether, 3 parts of sodium lauryl sulfate, 0.1 part of potassium persulfate, 0.4 part of potassium chloride and 200 parts of water are fed stepwise under cooling, followed by heating at 60 to 65° C. for 6 hours to allow polymerization reaction to take place. Solid matter content of thus obtained latex is 34 percent.

13.4 parts of trimethylol propane dissolved in 96 parts of ethyl acetate is added slowly to 50.4 parts of hexamethylene diisocyanate. The mixture is heated at 50 to 55° C. for 10 hours to allow reaction to take place. Into the reaction mixture 27 parts of methyl ethyl ketone oxime is added at a room temperature and kept standing for 2 hours to allow reaction to take place. Thus obtained reaction mixture containing blocked isocyanate compounds is brought into the form of an emulsion containing 20 percent of solid matter, in the same manner as that described in Example 1.

An adhesive composition is prepared by mixing 100 parts of the latex and 15 parts of the emulsion.

The adhesive composition is brushed onto the back of a decorative paper, followed by drying at 80° C. for 1 minute.

Thus treated paper is mounted on a polywood and heated at 130° C. for 30 seconds under a ram pressure of 40 kg./cm.². On the surface of the paper adhered on the plywood, polyester resin (Polymal YG–100) is applied and cured by heating to finish it into a decorative sheet.

When a test piece of the decorative sheet of 90 mm. length and 25 mm. width is immersed in hot water heated to 70° C. for 2 hours, the paper does not peel from the plywood at all.

On the contrary, when polyvinyl acetate emulsion (previously known as an adhesive agent) is employed in place of the present adhesive composition, the paper adhered to the plywood peels completely when subjected to the same treatment.

(49 parts of maleic anhydride, 74 parts of phthalic anhydride and 80 parts of propylene glycol are subjected to condensation polymerization by heating at 160 to 220° C. in a stream of carbon dioxide gas. Thus prepared polyester is mixed with 70 parts of styrene, 0.05 part of paraffin, 0.01 part of hydroquinone, 0.5 part of 6% cobalt naphthenate and 1 part of methyl ethyl ketone peroxide to obtain the polyester resin YG–100.)

I claim:
1. An adhesive composition substantially consisting of (A) about 70 to 95 weight parts of latex containing about 20 to about 60 weight parts of a copolymer obtained by the polymerization of (a) about 70 to about 99.5 weight percent of at least one polymerizable compound having olefinic double bond, (b) about 0.25 to about 15 weight percent of carboxylic acid of the formula

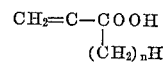

wherein $n$ is zero or one, and (c) about 0.24 to about 15 weight parts of ethylene glycol monomethacrylate, and (B) about 5 to about 30 weight parts of a blocked isocyanate compound obtained by the reaction of a blocking agent and isocyanate compound having more than one terminal NCO group.

2. An adhesive composition as claimed in claim 1, wherein the polymerizable compounds (a) are butadiene and methacrylic acid ester.

3. An adhesive composition as claimed in claim 1, wherein the polymerizable compounds (a) are butadiene and acrylic acid ester.

4. An adhesive composition as claimed in claim 1, wherein the polymerizable compounds (a) are butadiene and acrylonitrile.

5. An adhesive composition as claimed in claim 1, wherein the polymerizable compound (a) is acrylic acid ester.

6. An adhesive composition as claimed in claim 1, wherein the polymerizable compound (a) is vinyl acetate.

7. An adhesive composition as claimed in claim 1, wherein the isocyanate compound having more than one terminal NCO group is a reaction product of excess tolylene diisocyanate and low molecular polyol having a molecular weight of about 50 to about 500.

8. An adhesive composition as claimed in claim 1, wherein the isocyanate compound having more than one terminal NCO group is a reaction product of excess tolylene diisocyanate and polyesterpolyol having a molecular weight of about 500 to about 7000.

9. An adhesive composition as claimed in claim 1, wherein the isocyanate compound having more than one terminal NCO group is a reaction product of excess tolylene diisocyanate, low molecular polyol having a molecular weight of about 50 to about 500 and polyester polyol having a molecular weight of about 500 to about 7000.

10. An adhesive composition as claimed in claim 1, wherein the isocyanate compound having more than one terminal NCO group is a reaction product of excess tolylene diisocyanate and trimethylol propane.

11. An adhesive composition as claimed in claim 1, wherein the isocyanate compound having more than one terminal NCO group is a reaction product of excess tolylene diisocyanate trimethylol propane and polyester polyol.

References Cited

UNITED STATES PATENTS

| 3,047,548 | 7/1962 | Garrett | 260—80.7 |
| 3,137,589 | 6/1964 | Reinhard et al. | 117—14 |
| 3,231,533 | 1/1966 | Garrett et al. | 260—29.6 |
| 3,300,431 | 1/1967 | Ueno et al. | 260—29.6 |

MURRAY TILLMAN, Primary Examiner.

W. J. BRIGGS, Assistant Examiner.

U.S. DEPARTMENT OF COMMERCE
PATENT OFFICE
Washington, D.C. 20231

UNITED STATES PATENT OFFICE
CERTIFICATE OF CORRECTION

Patent No. 3,401,135            September 10, 1968

Yukio Sato

It is certified that error appears in the above identified patent and that said Letters Patent are hereby corrected as shown below:

Column 10, lines 12 to 14, the formula should appear as show below:

$$CH_2=C-COOH$$
$$|$$
$$(CH_2)nH$$

Signed and sealed this 10th day of February 1970.

(SEAL)
Attest:

Edward M. Fletcher, Jr.           WILLIAM E. SCHUYLER, JR.
Attesting Officer                   Commissioner of Patents